(12) United States Patent
West et al.

(10) Patent No.: US 7,006,438 B2
(45) Date of Patent: Feb. 28, 2006

(54) DISTRIBUTED CONTROL OF DATA FLOW IN A NETWORK SWITCH

(75) Inventors: Steve West, Petaluma, CA (US); Dirk Brandis, Novato, CA (US); Russ Smith, Sebastopol, CA (US); Frank Marrone, Cloverdale, CA (US)

(73) Assignee: Turin Networks, Petaluma, CA (US)

( * ) Notice: Subject to any disclaimer, the term of this patent is extended or adjusted under 35 U.S.C. 154(b) by 198 days.

(21) Appl. No.: 09/872,125

(22) Filed: May 31, 2001

(65) Prior Publication Data

US 2002/0186703 A1   Dec. 12, 2002

(51) Int. Cl.
*H04J 3/14*   (2006.01)
(52) U.S. Cl. ............... 370/231; 370/235; 370/395.1; 370/395.41; 370/468
(58) Field of Classification Search ............ 370/395.1, 370/412–413, 415, 417, 428–429, 406, 395.42, 370/395.43, 418, 468, 395.41, 230, 231, 370/235
See application file for complete search history.

(56) References Cited

U.S. PATENT DOCUMENTS

| | | | | |
|---|---|---|---|---|
| 5,812,527 A | * | 9/1998 | Kline et al. ............... | 370/232 |
| 5,889,778 A | * | 3/1999 | Huscroft et al. ....... | 370/395.31 |
| 6,058,116 A | * | 5/2000 | Hiscock et al. ............ | 370/401 |
| 6,130,889 A | * | 10/2000 | Feldman et al. ............ | 370/389 |
| 6,151,300 A | * | 11/2000 | Hunt et al. .................. | 370/231 |
| 6,154,446 A | * | 11/2000 | Kadambi et al. ............ | 370/239 |
| 6,185,209 B1 | * | 2/2001 | Wicklund ............... | 370/395.71 |
| 6,198,725 B1 | * | 3/2001 | Constantin et al. ......... | 370/252 |
| 6,201,809 B1 | * | 3/2001 | Lewin et al. ............... | 370/392 |
| 6,411,617 B1 | * | 6/2002 | Kilkki et al. ............... | 370/353 |
| 6,449,255 B1 | * | 9/2002 | Waclawsky ................ | 370/236 |
| 6,469,982 B1 | * | 10/2002 | Henrion et al. ............. | 370/230 |
| 6,574,223 B1 | * | 6/2003 | Brueckheimer et al. . | 370/395.6 |
| 2002/0085567 A1 | * | 7/2002 | Ku et al. ..................... | 370/396 |

* cited by examiner

*Primary Examiner*—Dang Ton
*Assistant Examiner*—Inder Pal Mehra
(74) *Attorney, Agent, or Firm*—Blakely, Sokoloff, Taylor & Zafman LLP

(57) ABSTRACT

The network switch described herein provides a cell/packet switching architecture that switches between line interface cards across a meshed backplane. In one embodiment, the switching can be accomplished at, or near, line speed in a protocol independent manner. The protocol independent switching provides support for various applications including Asynchronous Transfer Mode (ATM) switching, Internet Protocol (IP) switching, Multiprotocol Label Switching (MPLS) switching, Ethernet switching and frame relay switching. The architecture allows the network switch to provision service on a per port basis. In one embodiment, the network switch provides a non-blocking topology with both input and output queuing and per flow queuing at both ingress and egress. Per flow flow-control can be provided between ingress and egress scheduling. Strict priority, round robin, weighted round robin and earliest deadline first scheduling can be provided.

25 Claims, 4 Drawing Sheets

DISTRIBUTED CONTROL OF DATA FLOW IN A NETWORK SWITCH

FIELD OF THE INVENTION

The invention relates to network switches. More specifically, the invention relates to distributed control of data flow in network switches.

BACKGROUND OF THE INVENTION

In high bandwidth networks such as fiber optic networks, lower bandwidth services such as voice communications are aggregated and carried over a single fiber optic link. However, because the aggregated data can have different destinations some mechanism for switching the aggregated components is required. Switching can be performed at different levels of aggregation.

Current switching is accomplished in a synchronous manner. Signals are routed to a cross-connect or similar switching device that switch and route signals at some predetermined granularity level, for example, byte by byte. Synchronous switching in a cross-connect is a logically straight forward method for switching. However, because data flow between network nodes is not necessarily consistent, switching bandwidth may not be used optimally in a synchronous cross-connect. One source of data may use all available bandwidth while a second source of data may transmit data sporadically.

In order to support data sources that transmit at or near peak bandwidth, cross-connects are designed to provide the peak bandwidth to all data sources because specific data rates of specific data sources are not known when the cross-connect is designed. As a result, all data paths through the cross-connect provide the peak bandwidth, which may not be consumed by some or even most of the data sources.

A further disadvantage of synchronous switching architectures is that centralized switching control and interconnections grow exponentially as the input/output paths grow. Therefore, large switching architectures are complex and require complex control algorithms and techniques.

SUMMARY OF THE INVENTION

A network switch is described. The network switch includes ingress cards to receive data from sources external to the switch and egress cards to transmit data to devices external to the switch. The ingress cards have an ingress buffer to temporarily store data, an ingress scheduler coupled to the ingress buffer, and a set of ports coupled to the ingress scheduler. The ingress scheduler reads data from the ingress buffer and selectively transfers the data to one of the set of ports. The egress cards have a set of ports coupled to receive data from respective ingress card ports. The egress cards also have an egress buffer coupled to the set of egress card ports. The egress buffer selectively reads data from the ports and stores the data. An egress scheduler is coupled to the egress buffer. The egress scheduler reads data from the egress buffer and transmits data to the external devices.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for distributed control of data flow in a network switch are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The network switch described herein provides a cell/packet switching architecture that switches between line interface cards across a meshed backplane. In one embodiment, the switching can be accomplished at, or near, line speed in a protocol independent manner. The protocol independent switching provides support for various applications including, but not limited to, Asynchronous Transfer Mode (ATM) switching, Internet Protocol (IP) switching, Multiprotocol Label Switching (MPLS) switching, Ethernet switching and frame relay switching. The architecture allows the network switch to provision service on a per port basis.

In one embodiment, the network switch provides a nonblocking topology with both input and output queuing and per flow queuing at both ingress and egress. Per flow flow-control can be provided between egress and ingress scheduling. Strict priority, round robin, weighted round robin and earliest deadline first scheduling can be provided. In one embodiment, cell/packet discard is provided only at the ingress side of the switch. In one embodiment, early packet discard (EPD), partial packet discard (PPD) and random early discard (RED) are provided.

Figure 1:
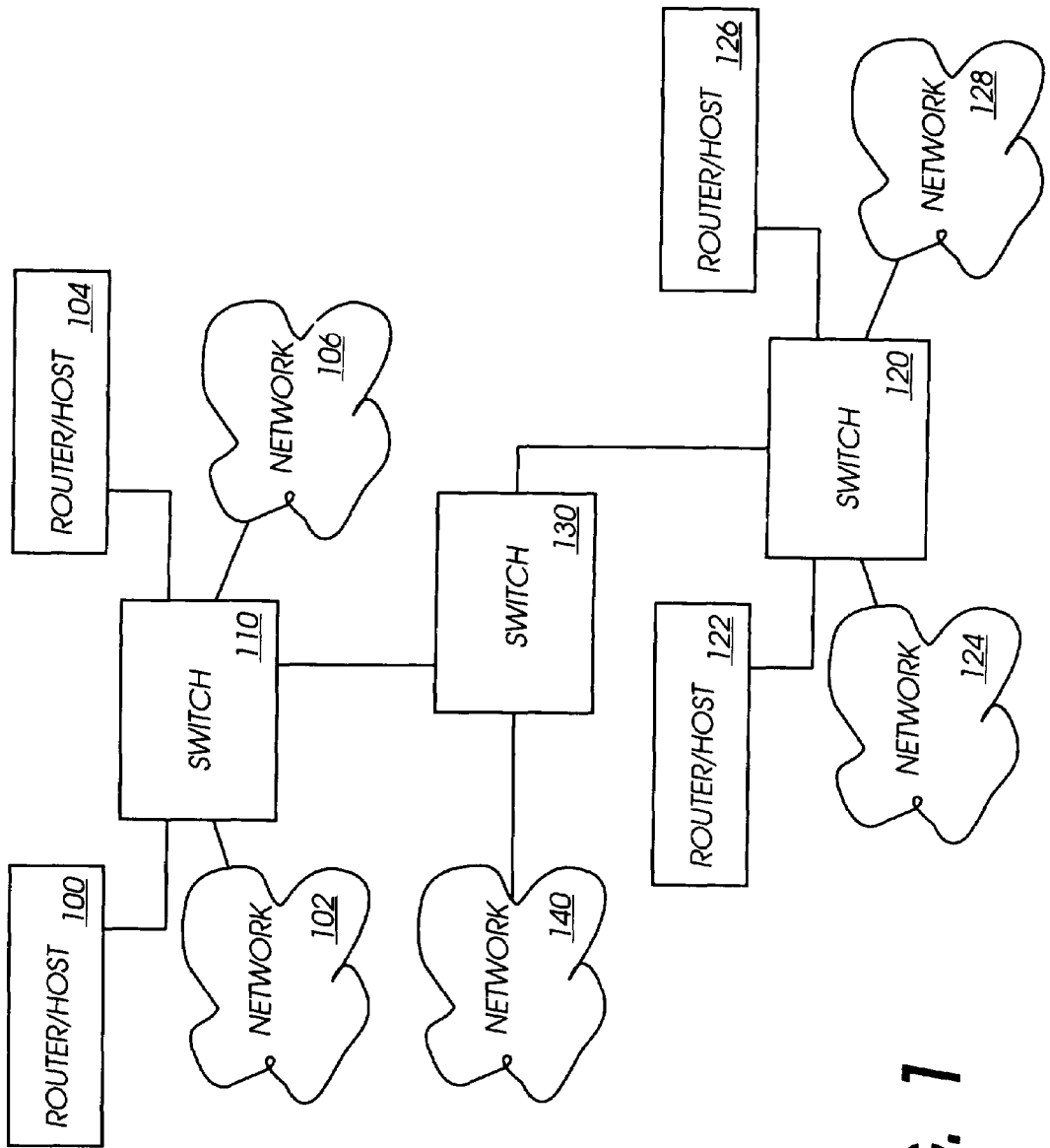
FIG. 1 illustrates one embodiment of a network architecture having multiple network switches.

FIG. 1 illustrates one embodiment of a network architecture having multiple network switches. While the switches of FIG. 1 are illustrated as coupled to only router/hosts and networks, any type of device that generates and/or receives data that can be carried by a wide area network can be used. The router/hosts and networks are intended to illustrate data devices and statistical multiplexing devices.

Switch 110 is coupled to router/host 100, network 102, network 106 and router/host 104 Any number of devices can be coupled to switch 110 in any manner known in the art. Similarly, router/host 122, network 124, network 128 and router/host 126 are coupled to switch 120. Any number of devices can be coupled to switch 120 in any maimer known in the art.

Switch 110 and 120 are coupled to switch 130. Switch 110 and 120 can also be coupled to other switch or other network devices (not shown in FIG. 1). Switch 130 is also coupled to network 140, which can include any type and any number of network elements including additional switches.

Switches 110, 120 and 130 receive data from multiple devices including router/hosts, local area networks and other switches. The switches can aggregate multiple data sources into a single data stream. Statistical aggregation allows multiple sources of packet/cell data to share a link or port. For example, 24 sources, each with sustained bandwidth of 64 kbps could share a DS1 (1.544 Mbps) link. Statistical aggregation allows sources of data to burst to bandwidth higher than their sustained rate, based on availability of bandwidth capacity of the link. Similarly, STS-1 (51.840 Mbps) signals from three networks can be received and combined into an OC-3 (155.520 Mbps) signal. The OC-3 signal can be transmitted to another switch for routing and/or further aggregation.

In one embodiment, the switches of FIG. 1 include multiple cards that are interconnected by a switching fabric. In one embodiment, the cards have both an ingress data path and an egress data path.

The ingress data path is used to receive data from the network and transmit the data to an appropriate card within the switch. The ingress data path schedules transmission of data across the switching fabric.

The egress data path is used to receive data from the switching fabric and transmit the data across the network. The egress data path schedules transmission of data out of the switch across the network. The ingress and egress data paths interact to prevent overflow of data within the network switch.

Figure 2:
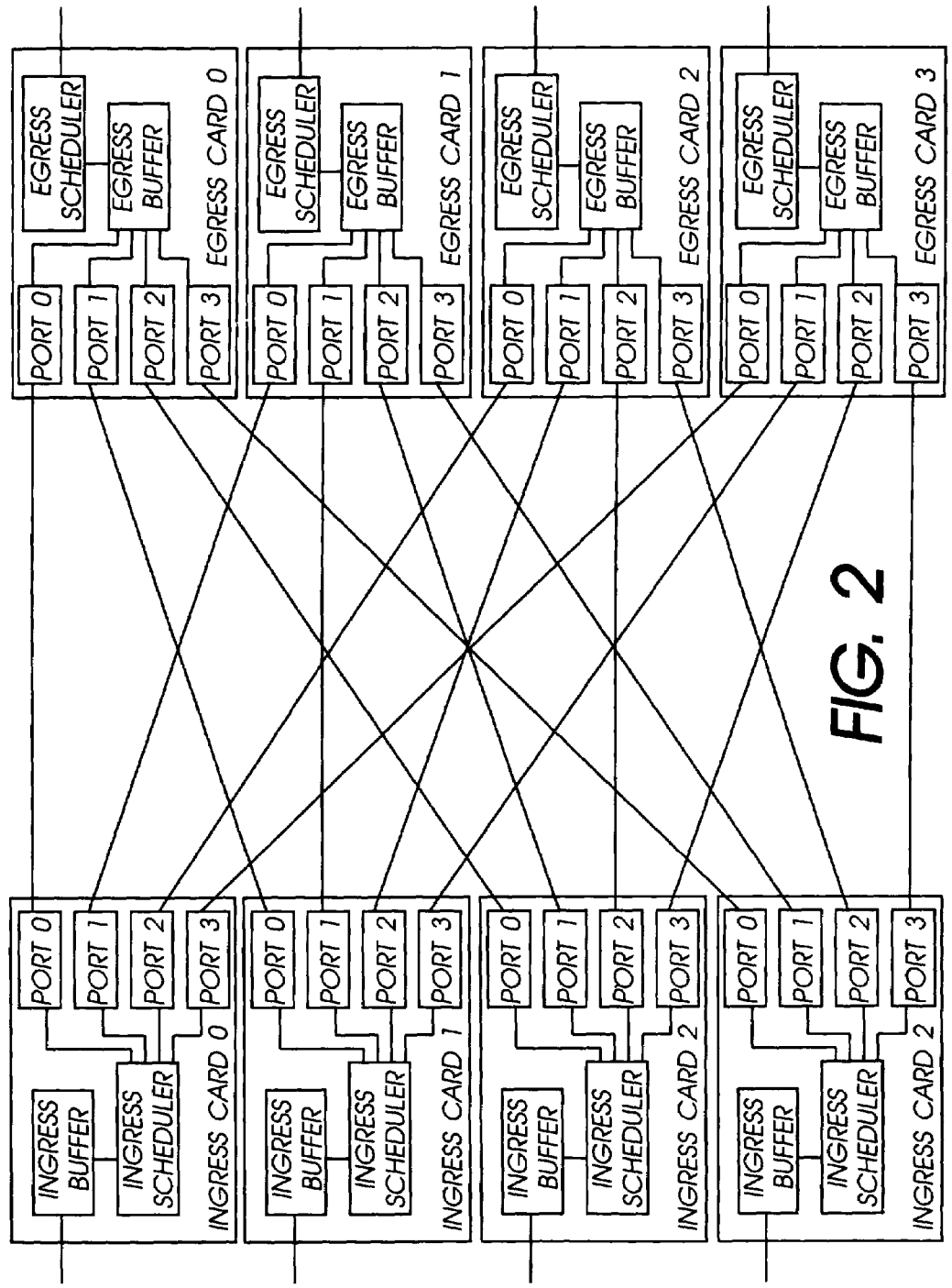
FIG. 2 illustrates one embodiment of an interconnection of cards within a network switch.

FIG. 2 illustrates one embodiment of an interconnection of cards within a network switch. The switch of FIG. 2 can be, for example, any of switches 110, 120 or 130 of FIG. 1. The switch of FIG. 2 is illustrated with four ingress cards and four egress cards for reasons of simplicity only. A switch can have any number of ingress cards and any number of egress cards. Also, data flow can be bi-directional. That is, the cards can also provide both egress and ingress functionality.

Each ingress card includes an ingress buffer that receives data from an external source (not shown in FIG. 2). Data can be in any format, for example, IP packets or ATM cells. The ingress buffers are coupled to ingress schedulers. The ingress schedulers dispatch data to egress cards via a set of ingress ports. In one embodiment, each ingress card has a port for each egress card to which the ingress card is coupled. For example, ingress card 0 is coupled to egress card 0 through port 0, to egress card 1 through port 1, to egress card 2 through port 2, and to egress card 3 through port 3.

In one embodiment, each ingress card is coupled to each egress card, the interconnection between the ingress cards and the egress cards has $n^2$ connections where n is the number of ingress/egress cards. Thus, the interconnection is referred to as an "$n^2$ mesh," or an "$n^2$ switching fabric." In another embodiment, the number of ingress cards is not equal to the number of egress cards, which is referred to as a "nxm mesh." The mesh is described in greater detail in U.S. patent application Ser. No. 09/746,212, entitled "A FULL MESH TNTERCONNECT BACKPLANE ARCHITECTURE," filed Dec. 22,2000, which is assigned to the corporate assignee of the present application and incorporated by reference.

In one embodiment, traffic crosses the mesh, or switching fabric, in an asynchronous manner in that no central clock signal drives data across the mesh. Data is transmitted by the ingress cards without reference to a bus or mesh clock or frame synchronization signal. A protocol for use in communicating over the mesh is described in greater detail in U.S. patent application Ser. No. 09/745,982, entitled "A BACKPLANE PROTOCOL," filed Dec. 22, 2000, which is assigned to the corporate assignee of the present invention and incorporated by reference.

Each egress card includes a port for each ingress card to which the egress card is coupled. For example, egress card 0 is coupled to ingress card 0 through port 0, to ingress card 1 through port 1, to ingress card 2 through port 2, and to ingress card 3 through port 3. The ports of the egress card are coupled to an egress buffer. The egress buffer is coupled to an egress scheduler that outputs data to a device external to the egress card (not shown in FIG. 2).

The architecture illustrated in FIG. 2 allows scheduling duties to be distributed between ingress and egress cards. Because the scheduling duties are distributed, a centralized scheduler is not required and transmission of data between ingress cards and egress cards can be accomplished in an asynchronous manner. This allows simpler control of data switching and more efficient use of switching fabric bandwidth.

When data is received by an ingress card the data is temporarily stored in the ingress buffer on the card. The ingress scheduler extracts data from the ingress buffer and sends the data to the appropriate port. For example data to be transmitted to egress card 2 are sent to port 2. In one embodiment, the ingress scheduler reads and sends data according to an earliest deadline first scheduling scheme. In alternate embodiments, strict priority scheduling, round robin scheduling, weighted round robin scheduling, or other scheduling techniques can be used.

Data that is transferred between ingress and egress cards can be variable in size. The data can be transmitted as a group of fixed length cells or as one or more variable length packets. In one embodiment, the packets on the ingress side compete with each other on a packet basis. Each packet competes against the other packets to be selected by the ingress scheduler. In one embodiment, when one packet is selected, all of the entire packet is moved across the switch fabric. Once the ingress scheduler selects a packet of a given priority, the packet is transmitted before another packet is selected.

Data must be transferred from the ingress side of the switch to the egress side of the switch through the switching fabric. In an $n^2$ mesh, n ingress sources can potentially contend for a single egress destination. The switch is required to transfer the data from ingress to egress such that the contracts of the individual data flows are honored. The contracts specify bandwidth, latency, jitter, loss and burst tolerance. All contracts must be honored under all traffic contention conditions.

In one embodiment the ingress scheduler provides all cell/packet discard functionality. Cell/packet discard can include, for example, early packet discard (EPD), partial packet discard (PPD), random early discard (RED), each of which is known in the art. Additional and/or different cell/packet discard procedures can also be used.

In one embodiment, the ingress schedulers independently schedule packets and cells to the egress side. To allow this independent scheduling to function, n separate buffers are provided on each egress, one per ingress. These independent cache buffers have sufficient bandwidth to allow simultaneous egress-side arrivals from all ingress devices. In one embodiment, the egress side sends "backpressure" messages to the ingress control access to the n independent cache buffers. Data in the n buffers is transferred to a larger egress buffer, from where it is scheduled to the egress ports.

The egress buffer receives data from the ports of the egress card in a predetermined manner. For example, data can be extracted from the ports in a round robin fashion, or data can be extracted from the ports on a priority basis. Also, a combination of round robin and priority-based extraction can also be used.

Data received from the egress card ports is stored in the egress buffer. In one embodiment the egress buffer includes a cache for each link (i.e., link between ingress card 2 and egress card 2, link between ingress card 3 and egress card 2). Each cache includes a queue for each class of data. By including a queue for each class of data, the egress buffer can provide quality of service functionality.

The egress scheduler extracts data from the egress buffer and transmits the data according to the appropriate network protocol to an external device (not shown in FIG. 2). In one embodiment, the egress scheduler extracts data from the egress buffer based on priority to provide quality of service functionality. In alternate embodiments, the egress scheduler can extract data from the egress buffer using earliest deadline first scheduling.

Figure 3:
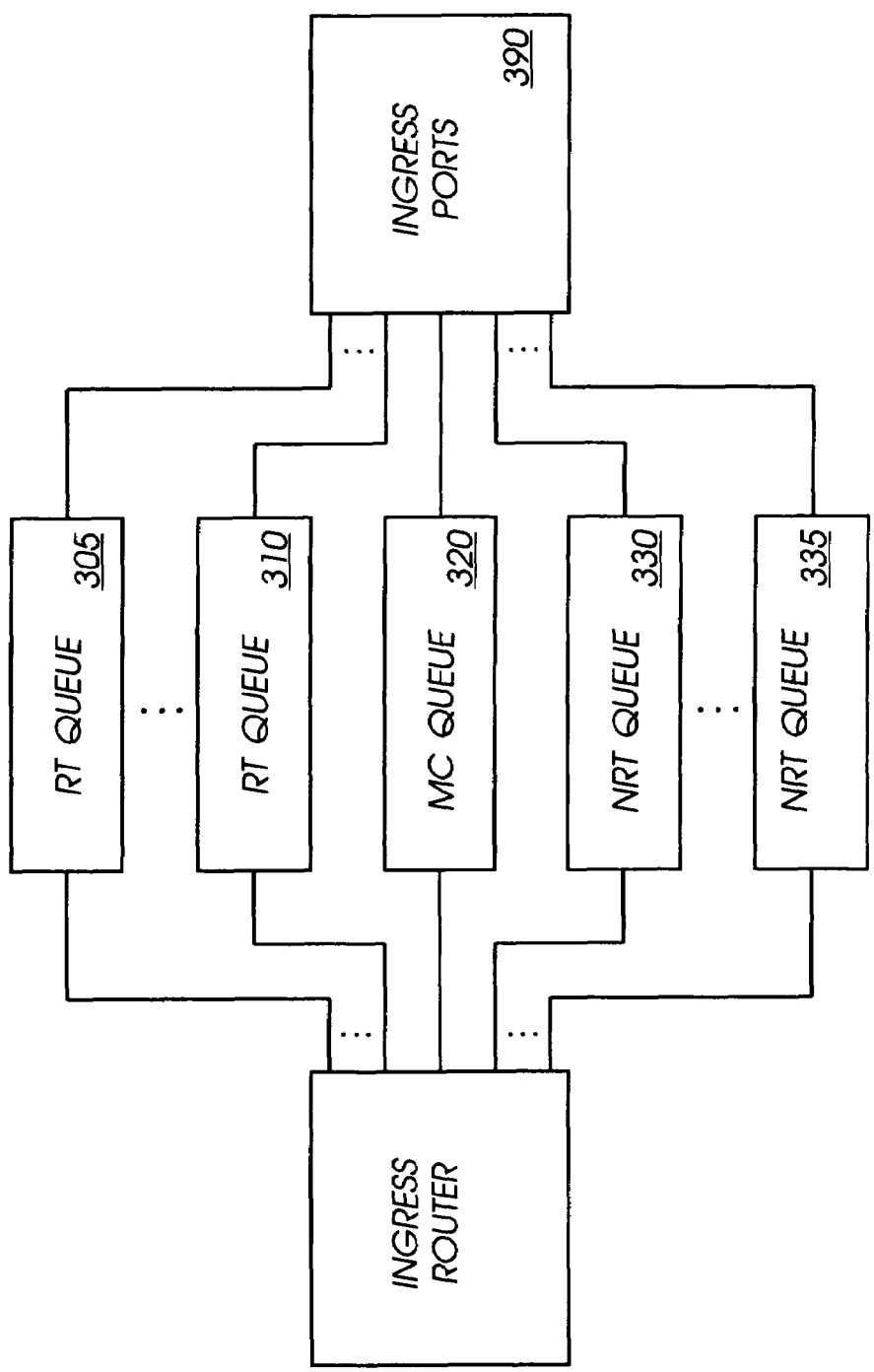
FIG. 3 conceptually illustrates one embodiment of an ingress scheduler.

FIG. 3 conceptually illustrates one embodiment of an ingress scheduler. In one embodiment, incoming data is categorized into one of three ingress traffic categories (ITCs). Having only three ITCs simplifies the architecture of the ingress scheduler. One embodiment of a mapping of ITCs to ATM and IP traffic is set forth in the following table. Other types of network traffic can be mapped to the three ITCs in a similar manner.

| ITC | | ATM | IP |
|---|---|---|---|
| Real Time (RT) | | CBR, VBR-RT | IntServ Guaranteed Services, DiffServ Expedited Forwarding, DiffServ Network Control Traffic |
| Multicast (MC) | | All ATM multicast connections | All IP multicast flows |
| Non Real Time (NRT) | Class 0 | GFR, VBR-NRT | IntServ Controlled Load Services, DiffServ Assured Forwarding class 1 |
| | Class 1 | UBR+, ABR with MCR > 0 | DiffServ Assured Forwarding class 2 |
| | Class 2 | ABR with MCR = 0 | DiffServ Assured Forwarding class 3 |
| | Class 3 | UBR | DiffServ Assured Forwarding class 4, Best Effort |

Ingress Traffic Category Mapping

In one embodiment, servicing of the three ITCs is accomplished according to the following priority: 1) RT, 2) MC, and 3) NRT, assuming no backpressure signals are active. If backpressure signals are active, the transmission of the corresponding category of data is stopped to avoid egress port buffer overflow. Lower priority data can be transmitted when the backpressure signal is active for higher priority data.

Ingress router 300 reads data from the ingress buffer (not shown in FIG. 3) and sends the data to the appropriate queue based on the ITC mapping described above. Real time data is sent to one of the RT group queues (e.g., 305, 310), multicast data is sent to MC queue 320, and non-real time data is sent to one of the NRT queues (e.g., 330, 335). In one embodiment, the ingress scheduler includes 16 RT queues; however, any number of RT queues can be provided.

In one embodiment, data is read out of the RT group queues in a round robin fashion. In another embodiment, the data is selected from the multiple RT group queues on a priority basis. Similarly, data is read out of the NRT class queues in a round robin fashion. The data is selected from the multiple NRT class queues in a weighted round robin fashion. Data from the three categories of data (RT, MC, NRT) is selected based on a priority basis to be sent to the appropriate ingress port 390.

Data flow control is described in greater detail in U.S. patent application Ser. No. 09/812,985 filed Mar. 19, 2001, entitled "METHOD AND SYSTEM FOR SWITCH FABRIC FLOW CONTROL," which is assigned to the corporate assignee of the present U.S. patent application and incorporated by reference herein.

Figure 4:
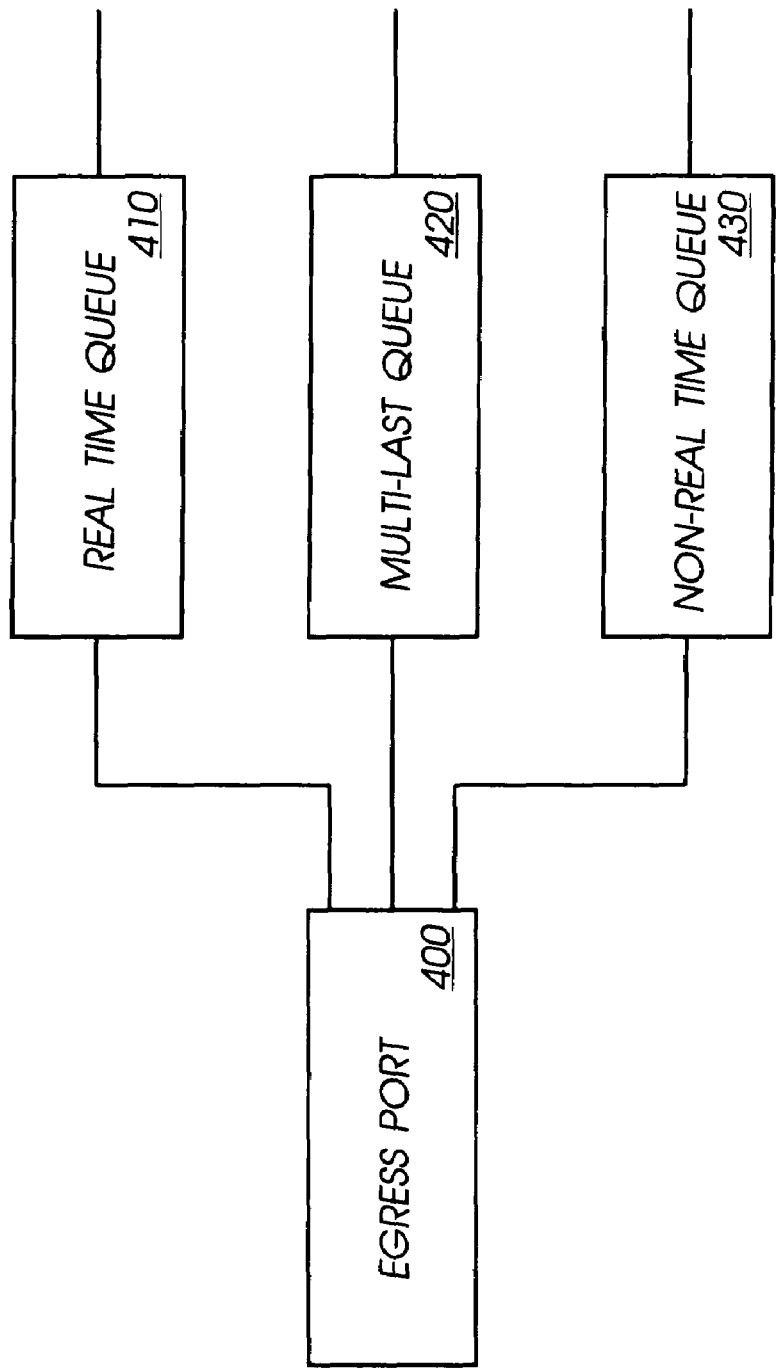
FIG. 4 conceptually illustrates one embodiment of a egress cache scheduling of egress card ports.

FIG. 4 conceptually illustrates one embodiment of a egress cache scheduling of egress card ports. In one embodiment, each egress card port has three associated FIFO buffers for real time data, multicast data and non-real time data, respectively.

In one embodiment, when data is received by egress port 400 the data is sent to one of three queues. The queues correspond to the ITCs. Real time data is stored in real time queue 410, multicast data is stored in multicast queue 420, and non-real time data is stored in non-real time queue 430. Data is read out of the queues in a round robin fashion. The queue from which data is transmitted is selected on a priority basis.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A network switch comprising:

an asynchronous mesh;

N ingress interfaces coupled to the asynchronous mesh, the N ingress interfaces having an ingress scheduler to receive data from external sources and to selectively schedule and asynchronously transmit the data across the asynchronous mesh according to a first schedule; and N egress interfaces coupled to the asynchronous mesh, the N egress interfaces having an egress scheduler to receive data from the asynchronous mesh and to schedule and transmit the data to external destinations according to a second schedule different than the first schedule, wherein the ingress scheduler performs scheduling and transmitting data across the asynchronous mesh independent of the egress scheduler performing scheduling and transmitting data to the external destinations, wherein each of the N ingress interfaces includes N ingress buffers to temporarily store the data received from the external sources before being transmitted across the asynchronous mesh, each of the N ingress buffers corresponding to each of the N egress interfaces respectively, wherein each of the N egress interfaces includes N egress buffers separated from the N ingress buffers to temporarily store the data received from each of the N ingress interfaces across the asynchronous mesh before being transmitted to the external destinations, each of the N egress buffers corresponding to each of the N ingress interfaces respectively, wherein the ingress scheduler retrieves the data from each of the ingress buffers and transmits the retrieved data to a corresponding egress buffer of each of the egress interfaces according to the first schedule, and wherein the egress scheduler retrieves the data from each of the egress buffers and transmits the retrieved data to the external destinations according to the second schedule independent of the first schedule.

2. The network switch of claim 1, wherein each of the ingress buffers of each ingress interface includes a plurality of ingress queues corresponding to a plurality of classes of data, and wherein each ingress interface segregates data received from the external sources into one or more of the ingress queues of a respective ingress buffer of a respective ingress interface based on a class identifier associated with the data.

3. The network switch of claim 2 wherein the egress interfaces generate a flow control signal to prevent transmission to one or more of the N egress buffers of the respective egress interfaces when an amount of data stored in the one or more of the N egress buffers exceeds a predetermined threshold.

4. The network switch of claim 3, wherein the flow control signal is associated with one of the plurality of service classes of data, wherein the flow control signal prevents data of an ingress queue associated with a class of the flow control signal to be transmitted while allowing other ingress queues having a priority lower than a priority of the data of the ingress queue associated with the class of the flow control signal to be transmitted.

5. The network switch of claim 4, wherein the plurality of classes of data comprises a real-time (RT) class, a multi-cast (MC) class, and a non-real-time (NRT) class, wherein the RT class has highest priority, wherein the MC class has a medium priority, and wherein the NRT class has lowest priority.

6. The network switch of claim 2 wherein the N ingress interfaces transfer data to a shared egress buffer and further wherein the egress interfaces schedule and retrieve the data stored in the shared egress buffer prior to transmitting the data to the external destinations.

7. The network switch of claim 2 wherein the N ingress interfaces concurrently transmit fixed-length cells and variable-length packets across the asynchronous mesh to the N egress interfaces.

8. The network switch of claim 1 wherein one or more of the N ingress interfaces segregates incoming data into queues based on a quality of service (QoS) identifier.

9. The network switch of claim 1 wherein one or more of the N ingress interfaces segregates incoming data into queues based on a priority identifier.

10. The network switch of claim 1 wherein one or more of the N ingress interfaces segregates incoming data into queues based on a deadline identifier.

11. The network switch of claim 1, wherein each egress buffer of each egress interface comprises one or more egress queues, each of the one or more egress queues corresponding to a distinctive service class, and wherein the data received from the N ingress interfaces is stored in the one or more egress queues based on the service class identifier associated with the data.

12. The network switch of claim 11, wherein each of the egress queues is associated with a respective priority.

13. The network switch of claim 12, wherein the egress scheduler schedules and transmits data from each of the egress queues to the external sources according to a schedule associated with each of the egress queues determined based on the respective priority.

14. The network switch of claim 13, wherein if an amount of data stored in one of the egress queues of an egress interface exceeds a predetermined threshold, the egress scheduler transmits a backpressure signal to a corresponding ingress interface, and wherein in response to the backpressure signal, the corresponding ingress interface prevents data having a service class associated with the queue of the egress interface from being transmitted to the egress interface, while allowing data of other service classes to be transmitted to the egress interface.

15. The network switch of claim 14, wherein in response to the backpressure signal associated with the queue of the egress interface, the corresponding ingress interface prevents data having a service class associated with the queue of the egress interface from being transmitted to the egress interface, while allowing data of service classes having priorities lower than a priority of the queue of the egress interface associated with the backpressure signal to be transmitted to the egress interface.

16. A network switch comprising:

N ingress cards coupled to receive data from external sources, each of the N ingress cards having a plurality of ports to transmit data, wherein each of the N ingress cards comprises an ingress scheduler coupled to the ports of the ingress card, the ingress scheduler to cause data to be selectively and asynchronously transmitted via the ports of the ingress card according to a first schedule, and wherein one or more of the ingress cards segregates incoming data into queues based on a service class identifier; and M egress cards coupled to the N ingress cards over an asynchronous mesh, each of the M egress cards having ports coupled to receive data from one or more of the plurality of ports of the N ingress cards, the egress cards coupled to transmit data to external destinations, wherein each of the M egress cards comprises an egress scheduler coupled to the ports of the egress card, the egress scheduler to cause data to be selectively transmitted to the external destinations according to a second schedule different then the first schedule, wherein the ingress scheduler and the egress scheduler schedule and transmit data independent of each other, wherein each of the N ingress cards includes M ports and each of the M egress cards includes N ports, wherein each of the M ports of each of the N ingress cards is communicatively coupled to one of the N ports of each of the M egress cards respectively, and wherein each of the N ports of each of the M egress cards is communicatively coupled to one of the M ports of each of the N ingress cards respectively.

17. The network switch of claim 16 wherein N and M are equal.

18. The network switch of claim 16 wherein one or more of the ingress cards segregates incoming data into queues based on a quality of service (QoS) identifier.

19. The network switch of claim 16 wherein one or more of the ingress cards segregates incoming data into queues based on a priority identifier.

20. The network switch of claim 16 wherein one or more of the N ingress cards segregates incoming data into queues based on a deadline identifier.

21. The network switch of claim 16 further comprising:
N ingress interfaces, each of the N ingress interfaces including N independent cache buffers to temporarily store incoming data at the ingress interfaces; and
N egress interfaces, each of the egress interfaces including N independent cache buffers to temporarily store data received from the N ingress interfaces,
wherein each of the N independent cache buffers of each ingress interface is coupled to one of N respective egress interfaces and wherein each of the N independent cache buffers of each egress interface is coupled to one of N respective ingress interfaces.

22. The network switch of claim 21 in which the egress interfaces generate a flow control signal to prevent access to one or more of the N independent cache buffers of the respective egress interfaces.

23. The network switch of claim 21 wherein the egress interfaces generate a flow control signal to prevent transmission to one or more of the N independent cache buffers of the respective egress interfaces.

24. The network switch of claim 21 wherein the N ingress interfaces transfer data to a shared egress buffer and further wherein the egress interfaces schedule and retrieve the data stored in the shared egress buffer prior to transmitting the data to the external destinations.

25. The network switch of claim 21 in which the N ingress interfaces concurrently transmit fixed-length cells and variable-length packets to the egress interfaces.

* * * * *